United States Patent Office 3,389,142
Patented June 18, 1968

3,389,142
ESTERS OF 2-SUBSTITUTED 1,2-DIHYDRO-
QUINOLINE - N - CARBOXYLIC ACIDS
AND THIONE ACIDS
Norman L. Weinberg, Cote St. Luc, Quebec, Canada, assignor, by mesne assignments, to Bristol-Myers Company, New York, N.Y., a corporation of Delaware
No Drawing. Filed Sept. 29, 1966, Ser. No. 583,076
13 Claims. (Cl. 260—287)

ABSTRACT OF THE DISCLOSURE

Esters of 2-substituted 1,2-dihydroquinoline-N-carboxylic acids and thione acids exhibit analgesic and tranquilizing activity and are useful as analgesic agents and transquilizing agents in mammals.

This invention relates to novel compounds. More particularly, this invention relates to certain novel analgesic and tranquilizing agents and to processes useful in the preparation thereof. In another aspect, this invention relates to a novel method of tranquilizing mammals.

It was the objective of the present invention to provide nontoxic agents with pronounced pharmacological activity in the analgesic area, including the activity more specifically called tranquilizing. It was another objective of the present invention to discover chemicals with these properties which would be well-absorbed upon oral administration to mammals. A third objective was to provide such activity in chemicals of a relatively simple structure in which pharmacological activity is usually completely lacking and in which there would not be present the complex structural features which often lead to toxic manifestations or to physiological activity of a type which is not desired and thus becomes an unwanted side-effect.

The objectives of the present invention have been achieved by the provision, according to the present invention, of the compounds of the formula (1) 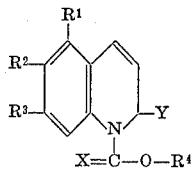

wherein $R^1$, $R^2$ and $R^3$ are the same or different and each represents hydrogen, chloro, bromo, iodo, fluoro, trifluoromethyl, (lower)alkyl, (lower)alkoxy, (lower)alkylthio, (lower)alksulfonyl, hydroxy, (lower)alkanoyloxy, amino, alkoxycarbonylamino or a group of the formula (2) 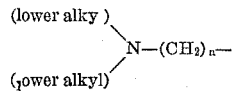

wherein $n$ is an integer from 0 to 3 inclusive,
X represents oxygen or sulfur,
$R^4$ represents hydrocarbonyl and particularly (lower)alkyl, (lower)alkenyl, (lower)alkynyl, cycloalkyl containing from 3 to 8 carbon atoms inclusive, halo(lower)alkyl other than α-haloalkyl or aralkyl and particularly a radical of the formula (3) 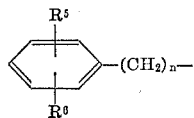

wherein $n$ is an integer from 1 to 3 inclusive, $R^5$ and $R^6$ each represents hydrogen, (lower)alkyl, (lower)alkoxy, chloro, bromo, iodo, fluoro or trifluoromethyl,
Y represents hydroxy, (lower)alkoxy, (lower)alkylthio, phenoxy, benzyloxy, ureido, (lower)alkenyloxy, (lower)alkynyloxy, amino, (lower)alkoxycarbonylamino, (lower)alkylamino, di(lower)alkylamino, phenylamino, benzylamino, di(lower)alkylamino(lower)alkoxy or a group of the formula (4) 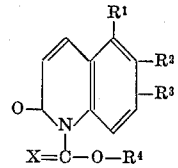

wherein $R^1$, $R^2$, $R^3$, $R^4$, and X have the meanings set forth above.

The term hydrocarbonyl as used herein means a monovalent non-aromatic radical containing only the elements carbon and hydrogen and containing less than eleven carbon atoms; examples of such a hydrocarbonyl group include ethyl, allyl, propargyl, cyclopropyl, cycloheptyl, cycloheptenyl, mono- or poly-methylcyclohexyl.

Two preferred embodiments of the present invention are the compounds of the formulae (5) 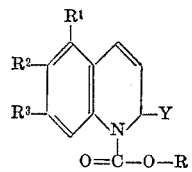

and (6) 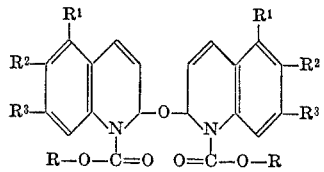

wherein R represents (lower)alkyl and
$R^1$, $R^2$ and $R^3$ each represent hydrogen, (lower)alkyl, chloro, bromo, iodo, amino, alkoxycarbonylamino or di(lower)alkylamono, and
Y represents hydroxy, (lower)alkoxy, (lower)alkylthio, phenoxy, benzyloxy, ureido, (lower)alkenyloxy, (lower)alkynyloxy, amino, (lower)alkoxycarbonylamino, (lower)alkylamino, di(lower)alkylamino, phenylamino, benzylamino, di(lower)alkylamino(lower)alkoxy;

and the compounds of the formulae (7) 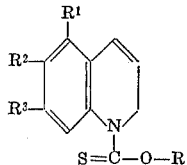

(8) 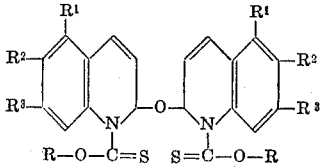

3 wherein R represents (lower)alkyl, and $R^1$, $R^2$ and $R^3$ each represents hydrogen, (lower)alkyl, chloro, bromo, iodo, amino, alkoxycarbonylamino or di(lower)alkylamino, and Y represents hydroxy, (lower)alkoxy, (lower)alkylthio, phenoxy, benzyloxy, ureido, (lower)alkenyloxy, (lower(alkynyloxy, amino, (lower)alkoxycarbonylamino, (lower)alkylamino, di(lower)alkylamino, phenylamino, benzylamino, di(lower)alkylamino(lower)alkoxy.

Particularly preferred embodiments of the present invention are the hydrocarbonyl esters of 1,2-dihydroquinoline-N-carboxylic acid and especially the (lower) alkyl esters such as the methyl, ethyl and n-propyl esters.

The compounds of the formula (9)

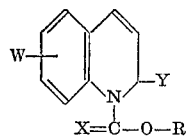

wherein W represents hydrogen, methyl, amino, alkoxycarbonylamino, di(lower)alkylamino or halogen and is attached to the 5-, 6- or 7-position, X represents oxygen or sulfur, R represents (lower)alkyl, Y represents hydroxy or (lower)alkoxy, Y represents hydroxy or (lower)alkoxy, and the compounds of the formula (10)

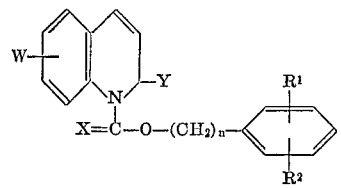

wherein W represents methyl, halogen, amino, alkoxycarbonylamino or di(lower)alkylamino and is attached at the 5-, 6- or 7-position, X represents oxygen or sulfur n is one, two or three and $R^1$ and $R^2$ each represents hydrogen, (lower)alkyl, (lower)alkoxy, chloro, bromo, iodo, fluoro or trifluoromethyl Y represents hydroxy or (lower)alkoxy; and their nontoxic pharmaceutically aceptable acid addition salts constitute a relatively limited, preferred embodiment of the present invention.

The term "(lower)alkyl" as used herein means both straight and branched chain aliphatic hydrocarbon radicals having from 1 to 6 carbon atoms such as methyl, ethyl, propyl, isopropyl, butyl, isobutyl, t-butyl, amyl, hexyl, etc.

Similarly, where the term "(lower)" is used as part of the description of another group e.g. (lower)alkoxy, it refers to the alkyl portion of such group which is therefore as described above in connection with (lower) alkyl.

To illustrate groups including (lower)alkyl groups, it is pointed out that (lower)alkoxy includes such radicals as methoxy, ethoxy, isopropoxy, etc.; (lower)alkylthio includes methylthio, ethylthio, butylthio, etc.; (lower)alkanoyl includes acetyl, propionyl, butyryl, etc.; (lower)alkylsulfonyl includes methylsulfonyl, ethylsulfonyl, hexylsulfonyl, etc.; di(lower)alkylamino includes dimethylamino, diethylamino, ethylmethylamino, etc.

Most of the compounds of the present invention may be regarded as nonbasic amides and in any event do not form ordinary, stable acid addition salts. However, those which contain basic groups at the 2-, 5-, 6- or 7-position such as amino, di(lower)alkylamino or di(lower)alkylaminoalkyl groups do form useful, nontoxic pharmaceutically acceptable acid addition salts with both organic and inorganic acids, e.g. glycolic, citric, maleic, succinic, acetic, ascorbic, gluconic, palmitic, oleic, lactic, pantothenic, sulfuric, hydrochloric, nitric, phosphoric, hydrobromic, hydriodic and the like. When compared to the liquid nature of many of the compounds of the present invention, many of these salts are of particular value in pharmaceutical formulations because their solid, crystalline nature increases ease of handling.

The compounds of this invention are prepared according to the following procedures as exemplified below:

(A) The compounds of formula 1 wherein Y is hydroxy or (11)

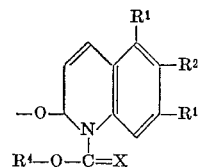

wherein $R^1$, $R^2$, $R^3$, $R^4$ and X are as described above, are prepared by reacting the appropriate quinoline with a chloroformate or a chlorothionformate, thus:

(12)

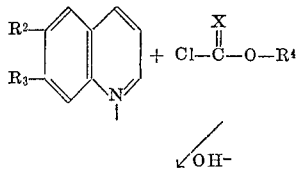

(13)

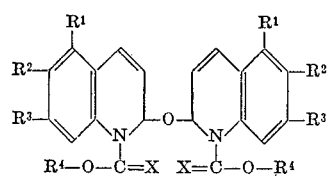

wherein X, $R^1$, $R^2$, $R^3$ and $R^4$ have the meanings set forth above.

The reaction is conducted using at least an equimolar weight of the chloroformate at a temperature of about 0° C. to room temperature or even up to 50° C. in the presence of a base, e.g. sodium hydroxide and potassium hydroxide and preferably in an inert solvent such as dimethylformamide.

The foregoing procedure produces a mixture of the 2-hydroxy compound and the diether which may be separated if desired.

(B) The compounds of Formula 1 other than those the preparation thereof is described in A above are prepared as exemplified below by reacting the appropriate compound of Formula 12 of Formula 13 or a mixture thereof with a alcohol, thiol amide or amine of the formula

(14)    H—Y' wherein Y' is (lower)alkoxy, (lower)alkylthio, phenoxy, benzyloxy, (lower)alkenyloxy, (lower)alkynyloxy, amino, (lower)alkoxycarbonylamino, (lower)alkylamino, di(lower)alkylamino, phenylamino, benzylamino or di(lower)alkylaminoalkoxy or a salt thereof, in the presence of a Lewis acid, e.g. boron trifluoride, aluminum chloride, ferric chloride and the like.

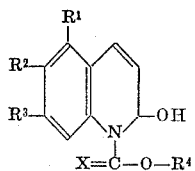

and/or

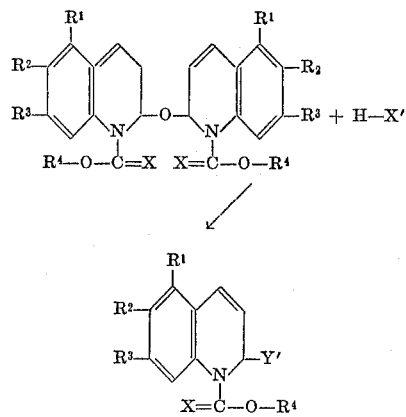

wherein X, Y', R¹, R², R³ and R⁴ have the meanings set forth above.

The reaction is conducted using an equimolar weight or slight excess of the compound of Formula 14 at a temperature of about 0° C. to room temperature or even up to 50° C., in the presence of a Lewis acid, preferably boron trifluoride, and preferably in an inert solvent such as diethyl ether.

Alternatively, the compounds of the present invention prepared by procedure B are prepared in the one-step process exemplified below by reacting the quinoline with the chloroformate and a compound of Formula 14 or a salt thereof. Preferably the three reactants are mixed at a temperature of about 0° C. to 50° C. in the presence of a base and in a solvent such as dimethylformamide.

The substituted quinolines used as starting materials in the synthesis of the compounds of the present invention (procedure A) are prepared by well-known methods, e.g., as summarized on pages 226–239 of Volume IV, The Chemistry of the Carbon Compounds by Victor von Richter, edited by Richard Anschutz, translated from the twelfth German edition, Elsevier Publishing Co., Inc., New York, New York (1947) and in Chapter 1, Volume 4, of Heterocyclic Compounds, edited by Robert C. Elderfield, John Wiley and Sons, Inc., New York, New York (1952) and on pages 584–627 of Chemistry of Carbon Compounds, edited by E. H. Rood, Volume IV, Part A, "Heterocyclic Compounds," Elsevier Publishing Company, New York, New York (1957).

The reagents of the formulae

15) 

and

(16) 

wherein R⁴ has the meaning set out above, are prepared, for example, by reaction of phosgene or thiophosgene with the appropriate alcohol or haloalcohol as illustrated on pages 833, 886–899 of Chemistry of Carbon Compounds, edited by E. H. Rodd, Volume 1, Part B, "Aliphatic Compounds," Elsevier Publishing Company, New York, New York (1952). References to many such compounds are indexed in Chemical Abstracts as esters under "Formic acid, chloro-," "Formic acid, chlorothion-" and "Formic acid, chlorothio-."

The compounds of Formula 14 used in procedure B are either commercially available, known in the art or can be easily prepared in accordance with standard organic procedures described in the literature.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compounds of this invention represented by Formulae 12 and 13 when administered orally or parenterally in an effective amount to mammals are effective in treating pain. These compounds are also useful as intermediates for the preparation of the other compounds of this invention include within Formula 1. The compounds of Formula 1 other than those represented by Formulae 12 and 13 when administered orally or parenterally in an effective amount to mammals, are effective in inducing tranquility in mammals.

The following examples are intended to illustrate the invention described herein without unduly restricting it.

Example 1.—Preparation of 2-hydroxy-N-carbethoxy-1,2-dihydroquinoline and di-(N-carbethoxy-1,2-dihydro-2-quinolyl)ether

and

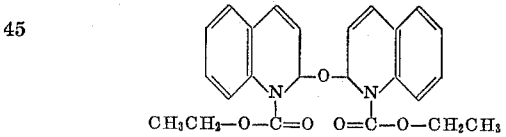

A cold (15° C.) solution of 220 g. (2.0 mole) of ethyl chloroformate, 260 g. (2.0 mole) of quinoline, and 600 ml. of dimethylformamide is added over 5 minutes with vigorous stirring to a mixture of 240 g. potassium hydroxide in 400 ml. of water and 1600 g. of crushed ice. After stirring a further 10 minutes, the mixture was extracted with 1 liter of methylene chloride and the organic extract washed with water, dried over anhydrous magnesium sulfate, filtered and evaporated leaving 400 g. of pale brown liquid containing 2-hydroxy-N-carbethoxy-1,2-dihydroquinoline and di-(N-carbethoxy-1,2-dihydro-2-quinolyl)-ether and quinoline, (product A). Concentration of 200 g. of this oil is carried out by distillation at a bath temperature of not greater than 100° C. to remove unreacted quinoline (B.P. 60–80° C., 0.1 mm.). A viscous residue weighing 125 g. containing 2 - hydroxy-N-carbethoxy-1,2-dihydroquinoline and di-(N-carbethoxy-1,2-dihydro-2-quinolyl)ether remained in the pot (product B).

The mixture of 2-hydroxy-N-carbethoxy-1,2-dihydroquinoline and di - (N-carbethoxy-1,2-dihydro-2-quinolyl) ether described above was tested for analgesic activity by the rat tail flick test. At dosages of 50 mm./kg. s.c. analgesic activity was observed.

Example 2.—Preparation of di-(N-carbethoxy-1,2-dihydro-2-quinolyl)ether

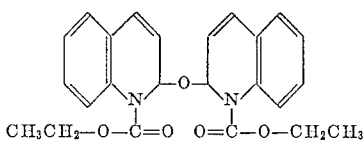

A mixture of 25 g. of product B of Example 1 in 50 ml. of cyclohexane kept at 5° C. for 72 hours deposited 4 g. of colorless solid, M.P. 139–141° C. Recrystallization from cyclohexane gave di-(N-carbethoxy-1,2-dihydro-2-quinolyl)ether, M.P. 141.5–143° C. (decomposing at 165° C.). The infrared spectrum had a strong band at 1705 (carbamate), and a weak band at 1650 cm.$^{-1}$ (c.=c.).

Analysis.—Calc'd for $C_{24}H_{24}N_2O_5$: C, 68.56; H, 5.75; N, 6.66. Found: C, 68.53; H, 5.77; N, 6.83.

Example 3.—Preparation of N-carbethoxy-2-ethoxy-1,2-dihydroquinoline

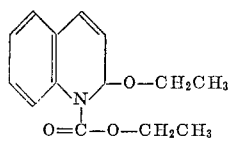

A solution consisting of 120 g. of product B of Example 1, 100 ml. of absolute ethanol, 500 ml. of anhydrous diethyl ether, and 10 drops of boron trifluoride etherate is stirred at 20° C. for 5 hours. The ethereal solution is washed with saturated sodium bicarbonate and water, dried over anhydrous magnesium sulfate, filtered, and concentrated, leaving an oil. The oil is distilled, yielding 47 g. of colorless product, N-carbethoxy-2-ethoxy-1,2-dihydroquinoline, B.P. 125–128° C., 0.1 mm. On standing, the material solidified, M.P. 56–57° C.

The tranquilizing activity of this compound was indicated by its ability, at a dose as low as 50 mgm./kg. p.o. in rats, to block a conditioned response in the usual test, in which the rats are trained to climb a pole when a buzzer is sounded in order to avoid a subsequent electric shock to their feet if they remain on the floor of the cage.

Analysis.—Calc'd for $C_{14}H_{17}NO_3$: C, 67.99; H, 6.93; N, 5.66. Found: C, 67.91; H, 6.94; N, 5.66.

Example 4.—Additional preparation of N-carbethoxy-2-ethoxy-1,2-dihydroquinoline

A mixture consisting of 2.69 g. (0.00638 mole) of di-(N-carbethoxy-1,2-dihydro-2-quinolyl)ether, 2 ml. of absolute ethanol, 50 ml. of diethyl ether and 1 drop of boron trifluoride etherate is stirred at 20° C. for 3 hours. The reaction mixture is poured into 10 ml. of saturated sodium bicarbonate solution and 100 ml. of water is added. The organic layer is separated, dried over anhydrous magnesium sulfate, filtered and evaporated leaving 3.02 g. of product. The infrared and NMR spectra of this oil are identical to the product of Example 3.

Example 5.—Preparation of N-carbethoxy-2-butylthio-1,2-dihydroquinoline

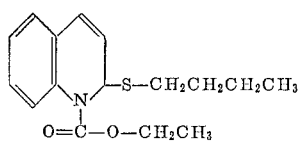

A solution of 50 g. of product A of Example 1, 30 ml. of 1-butanethiol, 200 ml. of diethyl ether, and 5 drops of boron trifluoride etherate is stirred at 20° C. for 4 hours. The ethereal solution is washed with saturated sodium bicarbonate and water, dried over anhydrous magnesium sulfate, filtered and concentrated leaving an oil. The oil is distilled yielding 31 g. of product, N-carbethoxy-2-butylthio-1,2-dihydroquinoline, B.P. 140° C. (0.05 mm.).

Analysis.—Calc'd for $C_{16}H_{21}NO_2S$: C, 65.95; H, 7.27; N, 4.81. Found: C, 65.92; H, 7.63; N, 5.47.

Example 6.—Preparation of N,N'-dicarbethoxy-2-amino-1,2-dihydroquinoline

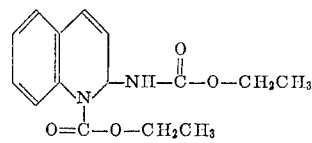

A solution of 20 g. of product A of Example 1, 15 g. of ethyl carbamate, 100 ml. of diethyl ether, enough glycol dimethyl ether to cause solution, and 5 drops of boron trifluoride etherate is stirred at 20° C. for 3 hours. The etheral solution is washed with saturated sodium bicarbonate and water, dried over magnesium sulfate, filtered and concentrated giving 9 g. of solid, M.P. 108–109° C., which on crystallization from cyclohexane gives 8 g. of product, N,N'-dicarbethoxy-2-amino-1,2-dihydroquinoline, M.P. 110–111.5° C. The infrared spectrum has characteristic absorptions at 3290 (N–H), 1695–1710 (carbamate carbonyls), 1650 (shoulder for c.=c.), and 1530 cm.$^{-1}$ (amide).

Example 7.—Direct preparation of N-carbethoxy-2-methoxy-1,2-dihydroquinoline

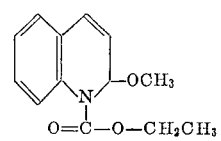

To a cold (5° C.) magnetically stirred slurry of 21.6 g. (0.40 mole) of sodium methoxide in 200 ml. of dimethylformamide is added a solution of 21.6 g. (0.20 mole) of ethyl chloroformate, 25.8 g. (0.20 mole) of quinoline, and 200 ml. of dimethylformamide dropwise over one-half hour. The mixture is slowly allowed to reach room temperature over 5 hours.

The mixture is filtered through "Celite" into 1 liter of water and extracted with 200 ml. of diethyl ether. The organic extract is washed with water, dried over magnesium sulfate, filtered and evaporated leaving an oil which on distillation provided 9 g. (19%) of product, N-carbethoxy-2-methoxy-1,2-dihydroquinoline, B.P. 130° C., 0.2 mm.

Example 8.—Preparation of N-carbethoxy-2-acetamido-1,2-dihydroquinoline

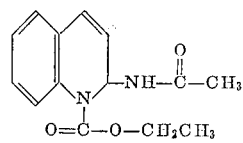

A mixture consisting of 11.7 g. (0.050 mole) of N-carbethoxy-2-methoxy-1,2-dihydroquinoline, 3.0 g. (0.050 mole) of acetamide, 250 ml. of diethyl ether, and 2 drops of boron trifluoride etherate is stirred at 20° C. for 5 hours. The mixture is treated with 0.5 g. of sodium methoxide and evaporated to dryness. Ether (100 ml.) is added and the solution washed with water, dried over magnesium sulfate, filtered, and concentrated leaving 10.5 g. of an oil. This is crystallized from cyclohexane and a little glycol dimethyl ether, giving 1.5 g. of product, N-carbethoxy-2-acetamido - 1,2 - dihydroquinoline, M.P. 138.5–141° C.

Example 9.—Preparation of 2-ureido-N-carbethoxy-1,2-dihydroquinoline

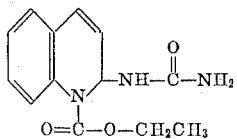

A mixture of 20 g. of product A of Example 1, 15 g. of urea, 250 ml. of dry diethyl ether and 5 drops of boron trifluoride are stirred for 3 hours at 20–25° C. Saturated sodium bicarbonate solution (200 ml.) and trichloromethane (200 ml.) are added. The mixture is filtered and the solid precipitate washed with water and air dried. The resulting product weighs 9.5 g. and has a melting point of 141–143° C. (dec.).

The filtrate organic layer is separated, washed with 200 ml. of water, dried over magnesium sulfate and filtered. The filtrate is concentrated leaving a semi-solid residue. The residue is taken up in cyclohexane and filtered and air dried. The product weighs 5.5 g. and has a melting point of 141–143° C. (dec.).

The two products are combined and crystallized twice from glycol-dimethyl ether yielding 3.0 g. of the product, 2-ureido-N-carbethoxy - 1,2 - dihydroquinoline, having a melting point of 150–151° C. (dec.).

*Analysis.*—Calc'd for $C_{13}H_{15}N_3O_3$: C, 59.76; H, 5.79; N, 16.08. Found: C, 58.91; H, 5.72; N, 15.64.

Example 10.—Additional preparation of N,N'-dicarbethoxy-2-amino-1,2-dihydroquinoline

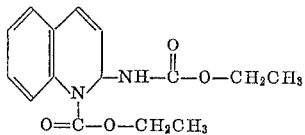

A solution consisting of 20 g. of product A of Example 1, 15 g. ethyl carbamate, 100 ml. dry diethyl ether and 5 drops of boron trifluoride is stirred for 3 hours at 25° C. After neutralization with saturated sodium bicarbonate solution (100 ml.), the ether layer is separated, washed with 3 x 100 ml. water and dried over magnesium sulfate. This is filtered and concentrated, leaving a semi-solid residue which is taken up in cyclohexane and filtered. The resulting precipitate is washed with petroleum ether (40–60 ml.) and air dried to give 9.0 g. of a solid, M.P. 108–109° C. Recrystallization from cyclohexane followed by drying in vacuo gives 8 g. of 2-carbethoxyamino-N-carbethoxy - 1,2 - dihydroquinoline, M.P. 110–111.5° C.

*Analysis.*—Calc'd for $C_{15}H_{18}N_2O_4$: C, 62.05; H, 6.25; N, 9.65. Found: C, 61.81; H, 6.25; N, 9.61.

Example 11.—Preparation of 2-methoxy-N-carbethoxy-1,2-dihydroquinoline

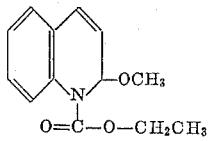

A solution consisting of 28 g. of product A of Example 1, 25 ml. methanol, 100 ml. dry diethyl ether and 5 drops of boron trifluoride is stirred at 25° C. for 15 hours. After neutralization with saturated sodium bicarbonate solution (50 ml.), the ether layer is separated and dried over anhydrous magnesium sulfate. This is filtered and concentrated leaving an oil. The oil is first distilled at 100° C., 0.2 mm. to remove impurities and then distilled to give 3.5 g. of 2-methoxy-N-carbethoxy-1,2-dihydroquinoline, B.P. 110–115° C./0.1 mm.

*Analysis.*—Calc'd for $C_{13}H_{15}NO_3$: C, 66.93; H, 6.48; N, 6.01. Found: C, 67.13; H, 6.44; N, 6.15.

Example 12.—Additional preparation of 2-butylthio-N-carbethoxy-1,2-dihydroquinoline

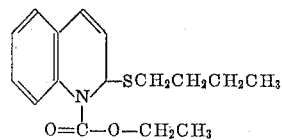

A solution consisting of 20 g. of product A of Example 1 20 ml. of 1-butanethiol, 100 ml. of dry diethyl ether and 5 drops of boron trifluoride etherate is stirred for 2 hours at 25° C. The reaction mixture is poured into 100 ml. of saturated sodium bicarbonate, the ether layer extracted, rewashed with 100 ml. of water and dried over magnesium sulfate. This is filtered and concentrated leaving a viscous oil. The oil is distilled first to remove the low boiling impurities and then the residual oil is distilled to give 10.0 g. of 2-butylthio-N-carbethoxy-1,2-dihydroquinoline, B.P. 140° C./0.05 mm.

*Analysis.*—Calc'd for $C_{16}H_{21}NO_2S$: C, 65.95; H, 7.27; N, 4.81. Found: C, 65.95; H, 7.63; N, 5.47.

Example 13.—Preparation of 2-butylamino-N-carbethoxy-1,2-dihydroquinoline

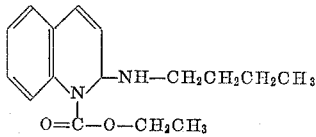

A solution consisting of 28 g. of product A of Example 1, 10 mg. n-butylamine and 100 ml. diethyl ether, and 3 drops of boron trifluoride etherate is stirred at 25° C. for 20 hours. After neutralization with saturated sodium bicarbonate solution (50 ml.), the ether layer is separated and dried over anhydrous magnesium sulfate. This is filtered and concentrated leaving an oil. The oil is distilled at 100° C./0.1 mm., leaving a viscous residue weighing 4.5 g. Crystallization of the residue from cyclohexane gives the product, 2-butylamino-N-carbethoxy - 1,2 - dihydroquinoline.

Example 14.—Preparation of 2-ethylthio-N-carbethoxy-1,2-dihydroquinoline

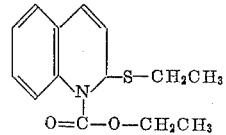

A solution consisting of 20 g. of product A of Example 1, 20 ml. ethane thiol, 150 ml. dry diethyl ether, and 5 drops of boron trifluoride etherate is stirred for 2 hours at 25° C. The reaction mixture is extracted with 2× 100 ml. of saturated sodium bicarbonate solution and the ether layer separated, dried over magnesium sulfate, filtered and concentrated leaving an oil. The oil is distilled first to remove the low boiling impurities and then the residual oil is distilled at a bath temperature of 160–170° C. to give 15 g. of 2-ethylthio-N-carbethoxy-1,2-dihydroquinoline, B.P. 133° C./0.05 mm.

*Analysis.*—Calc'd for $C_{14}H_{17}NO_2S$: C, 63.86; H, 6.51; N, 5.32. Found: C, 63.70; H, 6.58; N, 6.07.

Example 15.—Preparation of 2-allyloxy-N-carbethoxy-1,2-dihydroquinoline

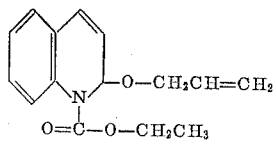

A solution consisting of 21 g. of product A of Example 1, 20 g. of allylalcohol, 100 ml. of diethyl ether and 5 to 10 drops of boron trifluoride etherate is stirred for 2 hours at 20–25° C. After neutralization with saturated sodium bicarbonate solution (50 ml.), the ether layer is separated, washed with 50 ml. water and dried over magnesium sulfate. This is filtered and concentrated leaving an oil. The oil is distilled first to remove the low boiling impurities and then the residual oil is distilled to give 7.5 g. of 2-allyloxy-N-carbethoxy-1,2 - dihydroquinoline, B.P. 130–128° C./0.07–0.05 mm.

Analysis.—Calc'd for $C_{15}H_{17}NO_3$: C, 69.48; H, 6.61. Found: C, 69.34; H, 6.68.

Example 16.—Preparation of 2-benzyloxy-N-carbethoxy-1,2-dihydroquinoline

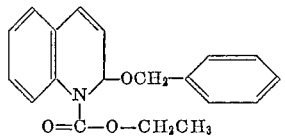

A solution consisting of 20 g. of product A of Example 1, 20 ml. benzyl alcohol, 100 ml. of dry diethyl ether, and 5 drops of boron trifluoride etherate is stirred for 2 hours at 25° C. The reaction mixture is poured into 100 ml. of saturated sodium bicarbonate solution, the ether layer extracted, rewashed with 100 ml. of water and dried over magnesium sulfate. This is filtered and concentrated leaving an oil. The oil is distilled first at 90–100° C. (0.05 mm.) to remove the low boiling impurities and then the residual oil is distilled to give 13 g. of 2-benzyloxy-N-carbethoxy - 1,2 - dihydroquinoline, B.P. 164–159° C./0.05–0.03 mm.

Analysis.—Calc'd for $C_{19}H_{19}NO_3$: C, 73.76; H, 6.19. Found: C, 74.46; H, 6.21.

Example 17.—Preparation of 2-isopropoxy-N-carbethoxy-1,2-dihydroquinoline

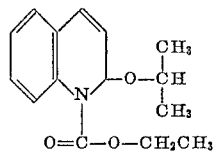

A solution of product A of Example 1, 25 ml. of isopropanol, 100 ml. of diethyl ether, and 5 drops of boron trifluoride etherate is stirred for 24 hours at 25–35° C. The solution is neutralized with saturated sodium bicarbonate, diluted with 500 ml. of water and extracted 2× 100 ml. of diethyl ether. The combined extract is dried over magnesium sulfate, filtered and concentrated leaving 30 g. of an oil. The oil is distilled to give 6 g. of 2-isopropoxy-N-carbethoxy-1,2-dihydroquinoline, B.P. 117° C./0.05 mm.

Analysis.—Calc'd for $C_{15}H_{19}NO_3$: C, 68.94; H, 7.33; N, 5.36. Found: C, 69.02; H, 7.22; N, 5.85.

Example 18.—Preparation of 2-t-butoxy-N-carbethoxy-1,2-dihydroquinoline

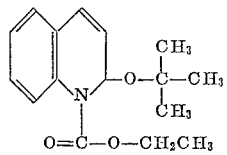

A solution consisting of 59 g. of product A of Example 1, 50 ml. of pure t-butyl alcohol, 100 ml. of diethyl ether and 5 drops of boron trifluoride etherate is stirred for 2 hours at 25° C. After neutralization with saturated sodium bicarbonate solution (50 ml.), the ether layer is separated and dried over anhydrous magnesium sulfate. This is filtered and concentrated leaving an oil. The oil is first distilled at 100° C., 0.2 mm. to remove low boiling impurities and then the residual oil distilled at a bath temperature of 15° C. to give 2.4 g. of 2-t-butoxy-N-carbethoxy-1,2-dihydroquinoline, B.P. 125° C./0.1 mm.

Analysis.—Calc'd for $C_{16}H_{21}NO_3$: C, 69.79; H, 7.69; N, 5.09. Found: C, 68.95; H, 7.04.

Example 19

Use in the procedure of Example 1 in place of the ethyl chloroformate of an equimolar weight of isobutyl chloroformate,
isopropyl chloroformate,
t-butyl chloroformate,
propargyl chloroformate,
allyl chloroformate,
methallyl chloroformate,
cyclopropyl chloroformate,
cyclohexyl chloroformate,
cycloheptenyl chloroformate,
benzyl chloroformate,
α-phenethyl chloroformate,
β-phenethyl chloroformate,
β-bromoethyl chloroformate,
β-iodoethyl chloroformate,
β-fluoroethyl chloroformate,
γ-chloropropyl chloroformate,
δ-chlorobutyl chloroformate,
p-methylbenzyl chloroformate,
o-methoxybenzyl chloroformate,
p-methoxybenzyl chloroformate,
o-chlorobenzyl chloroformate,
m-bromobenzyl chloroformate,
p-iodobenzyl chloroformate,
o-fluorobenzyl chloroformate,
p-trifluoromethylbenzyl chloroformate,
p-chlorophenylisopropyl chloroformate,
m-methoxybenzyl chloroformate,
o,p-dichlorobenzyl chloroformate,
o,o'-dimethoxybenzyl chloroformate and
o,p-dimethylbenzyl chloroformate, respectively, produces isobutyl 2-hydroxy-1,2-dihydroquinoline-N-carboxylate and di(N-isobutoxycarbonyl-1,2-dihydro-2-quinolyl) ether,
isopropyl 2-hydroxy-1,2-dihydroquinoline-N-carboxylate and di(N-isopropoxycarbonyl-1,2-dihydro-2-quinolyl) ether,
t-butyl 2-hydroxy-1,2-dihydroquinoline-N-carboxylate and di(N-t-butoxycarbonyl-1,2-dihydro-2-quinolyl) ether,
propargyl 2-hydroxy-1,2-dihydroquinoline-N-carboxylate and di-(N-propargyloxycarbonyl-1,2-dihydro-2-quinolyl)ether,
allyl 2-hydroxy-1,2-dihydroquinoline-N-carboxylate and di-(N-allyloxycarbonyl-1,2-dihydro-2-quinolyl)ether,
methallyl 2-hydroxy-1,2-dihydroquinoline-N-carboxylate and di-(N-methallyloxycarbonyl-1,2-dihydro-2-quinolyl)ether,
cyclopropyl 2-hydroxy-1,2-dihydroquinoline-N-carboxylate and di-(N-cyclopropoxycarbonyl-1,2-dihydro-2-quinolyl)ether,
cyclohexyl 2-hydroxy-1,2-dihydroquinoline-N-carboxylate and di-(N-cyclohexyloxycarbonyl-1,2-dihydro-2-quinolyl)ether,
cycloheptenyl 2-hydroxy-1,2-dihydroquinoline-N-carboxylate and di-(N-cycloheptenyloxycarbonyl-1,2-dihydro-2-quinolyl)ether,
benzyl 2-hydroxy-1,2-dihydroquinoline-N-carboxylate and di-(N-benzyloxycarbonyl-1,2-dihydro-2-quinolyl) ether,
α-phenethyl 2-hydroxy-1,2-dihydroquinoline-N-carboxylate and di-(N-α-phenethoxycarbonyl-1,2-dihydro-2-quinolyl)ether,
β-phenethyl 2-hydroxy-1,2-dihydroquinoline-N-carboxylate and di-(N-β-phenethoxycarbonyl-1,2-dihydro-2-quinolyl)ether,
β-bromoethyl 2-hydroxy-1,2-dihydroquinoline-N-carboxylate and di-(N-β-bromoethoxycarbonyl-1,2-dihydro-2-quinolyl)ether,
β-iodoethyl 2-hydroxy-1,2-dihydroquinoline-N-carboxylate and di-(N-β-iodoethoxycarbonyl-1,2-dihydro-2-quinolyl)ether, β-fluoroethyl 2-hydroxy-1,2-dihydroquinoline-N-carboxylate and di-(N-β-fluoroethoxycarbonyl-1,2-dihydro-2-quinolyl)ether,
γ-chloropropyl 2-hydroxy-1,2-dihydroquinoline-N-carboxylate and di-(N-γ-chloropropoxycarbonyl-1,2-dihydro-2-quinolyl)ether,
δ-chlorobutyl 2-hydroxy-1,2-dihydroquinoline-N-carboxylate and di-(N-δ-chlorobutoxycarbonyl-1,2-dihydro-2-quinolyl)ether,
p-methylbenzyl 2-hydroxy-1,2-dihydroquinoline-N-carboxylate and di-(N-p-methylbenzyloxycarbonyl-1,2-dihydro-2-quinolyl)ether,
o-methoxybenzyl 2-hydroxy-1,2-dihydroquinoline-N-carboxylate and di-(N-o-methoxybenzyloxycarbonyl-1,2-dihydro-2-quinolyl)ether,
p-methoxybenzyl 2-hydroxy-1,2-dihydroquinoline-N-carboxylate and di-(N-p-methoxybenzylcarbonyl-1,2-dihydro-2-quinolyl)ether,
o-chlorobenzyl 2-hydroxy-1,2-dihydroquinoline-N-carboxylate and di-(N-o-chlorobenzyloxycarbonyl-1,2-dihydro-2-quinolyl)ether,
m-bromobenzyl 2-hydroxy-1,2-dihydroquinoline-N-carboxylate and di-(N-m-bromobenzyloxycarbonyl-1,2-dihydro-2-quinolyl)ether,
p-iodobenzyl 2-hydroxy-1,2-dihydroquinoline-N-carboxylate and di(N-p-iodobenzyloxycarbonyl-1,2-dihydro-2-quinolyl)ether,
o-fluorobenzyl 2-hydroxy-1,2-dihydroquinoline-N-carboxylate and di-(N-o-fluorobenzyloxycarbonyl-1,2-dihydro-2-quinolyl)ether,
p-trifluoromethylbenzyl 2-hydroxy-1,2-dihydroquinoline-N-carboxylate and di-(N-p-trifluoromethylbenzyloxycarbonyl-1,2-dihydro-2-quinolyl)ether,
p-chlorophenylisopropyl 2-hydroxy-1,2-dihydroquinoline-N-carboxylate and di-(N-p-chlorophenylisopropoxycarbonyl-1,2-dihydro-2-quinolyl)ether,
m-methoxybenzyl 2-hydroxy-1,2-dihydroquinoline-N-carboxylate and di-(N-m-methoxybenzyloxycarbonyl-1,2-dihydro-2-quinolyl)ether,
o,p-dichlorobenzyl 2-hydroxy-1,2-dihydroquinoline-N-carboxylate and di-(N-o,p-dichlorobenzyloxycarbonyl-1,2-dihydro-2-quinolyl)ether,
o,o'-dimethoxybenzyl 2-hydroxy-1,2-dihydroquinoline-N-carboxylate and di-(N-o,o'-dimethoxybenzyloxycarbonyl-1,2-dihydro-2-quinolyl)ether,
o,p-dimethylbenzyl 2-hydroxy-1,2-dihydroquinoline-N-carboxylate and di-(N-o,p-dimethylbenzyloxycarbonyl-1,2-dihydro-2-quinolyl)ether, respectively.

Example 20

Use in the procedure of Example 1 in place of the ethyl chloroformate of an equimolar weight of isobutyl chlorothionformate,
isopropyl chlorothionformate,
t-butyl chlorothionformate,
propargyl chlorothionformate,
allyl chlorothionformate,
methallyl chlorothionformate,
cyclopropyl chlorothionformate,
cyclohexyl chlorothionformate,
cycloheptenyl chlorothionformate,
benzyl chlorothionformate,
α-phenethyl chlorothionformate,
β-phenethyl chlorothionformate,
β-bromoethyl chlorothionformate,
β-iodoethyl chlorothionformate,
β-fluoroethyl chlorothionformate,
γ-chloropropyl chlorothionformate,
δ-chlorobutyl chlorothionformate,
p-methylbenzyl chlorothionformate,
o-methoxybenzyl chlorothionformate,
p-methoxybenzyl chlorothionformate,
o-chlorobenzyl chlorothionformate,
m-bromobenzyl chlorothionformate,
p-iodobenzyl chlorothionformate,
o-fluorobenzyl chlorothionformate,
p-trifluoromethylbenzyl chlorothionformate,
p-chlorophenylisopropyl chlorothionformate,
m-methoxybenzyl chlorothionformate,
o-p-dichlorobenzyl chlorothionformate,
o,o'-dimethoxybenzyl chlorothionformate and
o,p-dimethylbenzyl chlorothionformate, produces isobutyl 2-hydroxy-12-dihydroquinoline-N-thioncarboxylate and
di-(N-isobutoxythiocarbonyl-1,2-dihydro-2-qiunolyl) ether,
isopropyl 2-hydroxy-1,2-dihydroquinoline-N-thioncarboxylate and
di-(N-isopropoxythiocarbonyl-1,2-dihydro-2-quinolyl) ether,
t-butyl 2-hydroxy-1,2-dihydroquinoline-N-thioncarboxylate and
di-(N-t-butoxythiocarbonyl-1,2-dihydro-2-quinolyl) ether,
propargyl 2-hydroxy1,2-dihydroquinoline-N-thioncarboxylate and
di-(N-propargyloxythiocarbonyl-1,2-dihydro-2-quinolyl)ether,
allyl 2-hydroxy-1,2-dihydroquinoline-N-thioncarboxylate and
di-(N-allyloxythiocarbonyl-1,2-dihydro-2-quinolyl)ether,
methallyl 2-hydroxy-1,2-dihydroquinoline-N-thioncarboxylate and
di-(N-methallyloxythiocarbonyl-1,2-dihydro-2-quinolyl)ether,
cyclopropyl 2-hydroxy-1,2-dihydroquinoline-N-thioncarboxylate and
di-(N-cyclopropoxythiocarbonyl-1,2-dihydro-2-quinolyl)ether,
cyclohexyl 2-hydroxy-1,2-dihydroquinoline-N-thioncarboxylate and
di-(N-cyclohexyloxythiocarbonyl-1,2-dihydro-2-quinolyl)ether,
cycloheptenyl 2-hydroxy-1,2-dihydroquinoline-N-thioncarboxylate and
di-(N-cycloheptenyloxythiocarbonyl-1,2-dihydro-2-quinolyl)ether,
benzyl 2-hydroxy-1,2-dihydroquinoline-N-thioncarboxylate and
di-(N-benzyloxythiocarbonyl-1,2-dihydro-2-quinolyl) ether,
α-phenethyl 2-hydroxy-1,2-dihydroquinoline-N-thioncarboxylate and
di-(N-α-phenethoxythiocarbonyl-1,2-dihydro-2-quinolyl)ether,
β-phenethyl 2-hydroxy-1,2-dihydroquinoline-N-thioncarboxylate and
di-(N-β-phenethoxythiocarbonyl-1,2-dihydro-2-quinolyl)ether,
β-bromoethyl 2-hydroxy-1,2-dihydroquinoline-N-thioncarboxylate and
di-(N-β-bromoethoxythiocarbonyl-1,2-dihydro-2-quinolyl)ether,
β-iodoethyl 2-hydroxy-1,2-dihydroquinoline-N-thioncarboxylate and
di-(N-β-iodoethoxythiocarbonyl-1,2-dihydro-2-quinolyl)ether,
β-fluoroethyl 2-hydroxy-1,2-dihydroquinoline-N-thioncarboxylate and
di-(N-β-fluoroethoxythiocarbonyl-1,2-dihydro-2-quinolyl)ether,
γ-chloropropyl 2-hydroxy-1,2-dihydroquinoline-N-thioncarboxylate and
di-(N-γ-chloropropoxyethiocarbonyl-1,2-dihydro-2-quinolyl)ether, δ-chlorobutyl 2-hydroxy-1,2-dihydroquinoline-N-thioncarboxylate and
di-(N-δ-chlorobutoxythiocarbonyl-1,2-dihydro-2-quinolyl)ether,
p-methylbenzyl 2-hydroxy-1,2-dihydroquinoline-N-thioncarboxylate and
di-(N-p-methylbenzyloxythiocarbonyl-1,2-dihydro-2-quinolyl)ether,
o-methoxybenzyl 2-hydroxy-1,2-dihydroquinolne-N-thioncarboxylate and
di-(N-o-methoxybenzyloxythiocarbonyl-1,2-dihydro-2-quinolyl)ether,
p-methoxybenzyl 2-hydroxy-1,2-dihydroquinoline-N-thioncarboxylate and
di-(N-p-methoxybenzyloxythiocarbonyl-1,2-dihydro-2-quinolyl)ether,
o-chlorobenzyl 2-hydroxy-1,2-dihydroquinoline-N-thioncarboxylate and
di-(N-o-chlorobenzyloxythiocarbonyl-1,2-dihydro-2-quinolyl)ether,
m-bromobenzyl 2-hydroxy-1,2-dihydroquinoline-N-thioncarboxylate and
di-(N-m-bromobenzyloxythiocarbonyl-1,2-dihydro-2-quinolyl)ether,
p-iodobenzyl 2-hydroxy-1,2-dihydroquinoline-N-thioncarboxylate and
di-(N-p-iodobenzyloxythiocarbonyl-1,2-dihydro-2-quinolyl)ether,
o-fluorobenzyl 2-hydroxyl-1,2-dihydroquinoline-N-thioncarboxylate and
di-(N-o-fluorobenzyloxythiocarbonyl-1,2-dihydro-2-quinolyl)ether,
p-trifluoromethylbenzyl 2-hydroxy-1,2-dihydro-quinoline-N-thioncarboxylate and
di-(N-p-trifluoromethylbenzyloxythiocarbonyl-1,2-dihydro-2-quinolyl)ether,
p-chlorophenylisopropyl 2-hydroxy1,2-dihydro-quinoline-N-thioncarboxylate and
di-(N-p-chlorophenylisopropoxythiocarbonyl-1,2-dihydro-2-quinolyl)ether,
m-methoxybenzyl 2-hydroxy-1,2-dihydroquinoline-N-thioncarboxylate and
di-(N-m-methoxybenzyloxythiocarbonyl-1,2-dihydro-2-quinolyl)ether,
o,p-dichlorobenzyl 2-hydroxy-1,2-dihydroquinoline-N-thioncarboxylate and
di-(N-o,p-dichlorobenzyloxythiocarbonyl-1,2-dihydro-2-quinolyl)ether,
o,o′-dimethoxybenzyl 2-hydroxy-1,2-dihydroquinoline-N-thioncarboxylate and
di-(N-o,o′-dimethoxybenzyloxythiocarbonyl-1,2-dihydro-2-quinolyl)ether,
o,p-dimethylbenzyl 2-hydroxy-1,2-dihydroquinoline-N-thioncarboxylate and
di-(N-o,p-dimethylbenzyloxythiocarbonyl-1,2-di-hydro-2-quinolyl)ether, respectively.

To illustrate the nomenclature used herein, isopropyl chlorothionformate has the structure

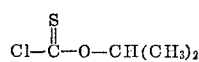

isopropyl 2-hydroxy-1,2-dihydroquinoline-N-thioncarboxylate has the structure

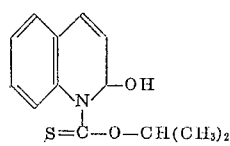

and di-(N-isopropoxythiocarbonyl-1,2-dihydro-2-quinolyl)ether has the structure

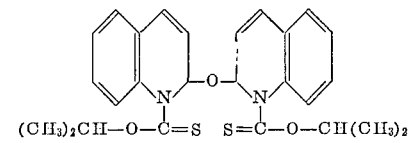

Example 21

Use in the procedure of Example 1 in place of the 260 g. quinoline, of an equimolar weight of 5-chloroquinoline,
6-bromoquinoline,
7-iodoquinoline,
7-fluoroquinoline,
5,7-dichloroquinoline,
5,7-dimethylquinoline,
5-methylquinoline,
7-methylquinoline,
6-chloroquinoline,
7-bromoquinoline,
6-iodoquinoline,
6-methylquinoline,
6-ethylquinoline,
5-chloro-6-methylquinoline,
6-chloro-5-methylquinoline,
7-chloro-6-methylquinoline,
6-cyanoquinoline,
5-bromoquinoline,
5-trifluoromethylquinoline,
6-trifluoromethylquinoline,
6-methyl-7-trifluoromethylquinoline,
5-methoxyquinoline,
5-acetoxyquinoline,
7-dimethylaminoquinoline, and
7-diethylaminoquinoline, produces ethyl 2-hydroxy-5-chloro-1,2-dihydroquinoline-N-carboxylate and
di-(N-ethoxycarbonyl-5-chloro-1,2-dihydro-2-quinolyl)ether,
ethyl 2-hydroxy-6-bromo-1,2-dihydroquinoline-N-carboxylate and
di-(N-ethoxycarbonyl-6-bromo-1,2-dihydro-2-quinolyl)ether,
ethyl 2-hydroxy-7-iodo-1,2-dihydroquinoline-N-carboxylate and
di-(N-ethoxycarbonyl-7-iodo-1,2-dihydro-2-quinolyl)ether,
ethyl 2-hydroxy-7-fluoro-1,2-dihydroquinoline-N-carboxylate and
di-(N-ethoxycarbonyl-7-fluoro-1,2-dihydra-2-quinolyl)ether,
ethyl 2-hydroxy-5,7-dichloro-1,2-dihydroquinoline-N-carboxylate and
di-(N-ethoxycarbonyl-5,7-dichloro-1,2-dihydro-2-quinolyl)ether,
ethyl 2-hydroxy-5,7-dimethyl-1,2-dihydroquinoline-N-carboxylate and
di-(N-ethoxycarbonyl-5,7-dimethyl-1,2-dihydro-2-quinolyl)ether,
ethyl 2-hydroxy-5-methyl-1,2-dihydroquinoline-N-carboxylate and
di-(N-ethoxycarbonyl-5-methyl-1,2-dihydro-2-quinolyl)ether,
ethyl 2-hydroxy-7-methyl-1,2-dihydroquinoline-N-carboxylate and
di-(N-ethoxycarbonyl-7-methyl-1,2-dihydro-2-quinolyl)ether,
ethyl 2-hydroxy-6-chloro-1,2-dihydroquinoline-N-carboxylate and
di-(N-ethoxycarbonyl-6-chloro-1,2-dihydro-2-quinolyl)ether, ethyl 2-hydroxy-7-bromo-1,2-dihydroquinoline-N-carboxylate and
di-(N-ethoxycarbonyl-7-bromo-1,2-dihydro-2-quinolyl)ether,
ethyl 2-hydroxy-6-iodo-1,2-dihydroquinoline-N-carboxylate and
di-(N-ethoxycarbonyl-6-iodo-1,2-dihydro-2-quinolyl)ether,
ethyl 2-hydroxy-6-methyl-1,2-dihydroquinoline-N-carboxylate and
di-(N-ethoxycarbonyl-6-methyl-1,2-dihydro-2-quinolyl)ether,
ethyl 2-hydroxy-6-ethyl-1,2-dihydroquinoline-N-carboxylate and
di-(N-ethoxycarbonyl-6-ethyl-1,2-dihydro-2-quinolyl)ether,
ethyl 2-hydroxy-5-chloro-6-methyl-1,2-dihydroquinoline-N-carboxylate and
di-(N-ethoxycarbonyl-5-chloro-6-methyl-1,2-dihydro-2-quinolyl)ether,
ethyl 2-hydroxy-6-chloro-5-methyl-1,2-dihydroquinoline-N-carboxylate and
di-(N-ethoxycarbonyl-6-chloro-5-methyl-1,2-dihydro-2-quinolyl)ether,
ethyl 2-hydroxy-7-chloro-6-methyl-1,2-dihydroquinoline-N-carboxylate and
di-(N-ethoxycarbonyl-7-chloro-6-methyl-1,2-dihydro-2-quinolyl)ether,
ethyl 2-hydroxy-6-cyano-1,2-dihydroquinoline-N-carboxylate and
di-(N-ethoxycarbonyl-6-cyano-1,2-dihydro-2-quinolyl)ether,
ethyl 2-hydroxy-5-bromo-1,2-dihydroquinoline-N-carboxylate and
di-(N-ethoxycarbonyl-5-bromo-1,2-dihydro-2-quinolyl)ether,
ethyl 2-hydroxy-5-trifluoromethyl-1,2-dihydroquinoline-N-carboxylate and
di-(N-ethoxycarbonyl-5-trifluoromethyl-1,2-dihydro-2-quinolyl)ether,
ethyl 2-hydroxy-6-trifluoromethyl-1,2-dihydroquinoline-N-carboxylate and
di-(N-ethoxycarbonyl-6-trifluoromethyl-1,2-dihydro-2-quinolyl)ether,
ethyl 2-hydroxy-6-methyl-7-trifluoromethyl-1,2-dihydroquinoline-N-carboxylate and
di-(N-ethoxycarbonyl-6-methyl-7-trifluoromethyl-1,2-dihydro-2-quinolyl)ether,
ethyl 2-hydroxy-5-methoxy-1,2-dihydroquinoline-N-carboxylate and
di-(N-ethoxycarbonyl-5-methoxy-1,2-dihydro-2-quinolyl)ether,
ethyl 2-hydroxy-5-acetoxy-1,2-dihydroquinoline-N-carboxylate and
di-(N-ethoxycarbonyl-5-acetoxy-1,2-dihydro-2-quinolyl)ether,
ethyl 2-hydroxy-7-dimethylamino-1,2-dihydroquinoline-N-carboxylate and
di-(N-ethoxycarbonyl-7-dimethylamino-1,2-dihydro-2-quinolyl)ether,
ethyl 2-hydroxy-7-diethylamino-1,2-dihydroquinoline-N-carboxylate and
di-(N-ethoxycarbonyl-7-diethylamino-1,2-dihydro-2-quinolyl)ether, respectively.

Ethyl esters of the corresponding 2-hydroxy-1,2-dihydroquinoline-N-carboxyl thion acids and the corresponding 1,2-dihydro-2-quinolyl ethers are produced by substituting an equimolar weight of ethyl chlorothionformate for the ethyl chloroformate used above.

Example 22

Use in the procedure of Example 3 in place of the mixture of 2-hydroxy-N-carbethoxy-1,2-dihydroquinoline and di-(N-carbethoxy-1,2-dihydro-2-quinolyl)ether of each of the products of Example 19 produces,
isobutyl 2-ethoxy-1,2-dihydroquinoline-N-carboxylate,
isopropyl 2-ethoxy-1,2-dihydroquinoline-N-carboxylate,
t-butyl 2-ethoxy-1,2-dihydroquinoline-N-carboxylate,
propargyl 2-ethoxy-1,2-dihydroquinoline-N-carboxylate,
allyl 2-ethoxy-1,2-dihydroquinoline-N-carboxylate,
methallyl 2-ethoxy-1,2-dihydroquinoline-N-carboxylate,
cyclopropyl 2-ethoxy-1,2-dihydroquinoline-N-carboxylate,
cyclohexyl 2-ethoxy-1,2-dihydroquinoline-N-carboxylate,
cycloheptenyl 2-ethoxy-1,2-dihydroquinoline-N-carboxylate,
benzyl 2-ethoxy-1,2-dihydroquinoline-N-carboxylate,
α-phenethyl 2-ethoxy-1,2-dihydroquinoline-N-carboxylate,
β-phenethyl 2-ethoxy-1,2-dihydroquinoline-N-carboxylate,
β-bromoethyl 2-ethoxy-1,2-dihydroquinoline-N-carboxylate,
β-iodoethyl 2-ethoxy-1,2-dihydroquinoline-N-carboxylate,
β-fluoroethyl 2-ethoxy-1,2-dihydroquinoline-N-carboxylate,
γ-chloropropyl 2-ethoxy-1,2-dihydroquinoline-N-carboxylate,
δ-chlorobutyl 2-ethoxy-1,2-dihydroquinoline-N-carboxylate,
p-methylbenzyl 2-ethoxy-1,2-dihydroquinoline-N-carboxylate,
o-methoxybenzyl 2-ethoxy-1,2-dihydroquinoline-N-carboxylate,
p-methoxybenzyl 2-ethoxy-1,2-dihydroquinoline-N-carboxylate,
o-chlorobenzyl 2-ethoxy-1,2-dihydroquinoline-N-carboxylate,
m-bromobenzyl 2-ethoxy-1,2-dihydroquinoline-N-carboxylate,
p-iodobenzyl 2-ethoxy-1,2-dihydroquinoline-N-carboxylate,
o-fluorobenzyl 2-ethoxy-1,2-dihydroquinoline-N-carboxylate,
p-trifluoromethylbenzyl 2-ethoxy-1,2-dihydroquinoline-N-carboxylate,
p-chlorophenylisopropyl 2-ethoxy-1,2-dihydroquinoline-N-carboxylate,
m-methoxybenzyl 2-ethoxy-1,2-dihydroquinoline-N-carboxylate,
o,p-dichlorobenzyl 2-ethoxy-1,2-dihydroquinoline-N-carboxylate,
o,o'-dimethoxybenzyl 2-ethoxy-1,2-dihydroquinoline-N-carboxylate,
o,p-dimethylbenzyl 2-ethoxy-1,2-dihydroquinoline-N-carboxylate, respectively.

Example 23

Use in the procedure of Example 3 in place of ethanol of an equimolar weight of ammonia,
methylamine,
diethylamine,
dimethylamine,
phenylamine,
benzylamine,
phenol,
benzyl alcohol,
methyl thiol,
propargyl alcohol, and
diethylaminomethanol, produces N-carbethoxy-2-amino-1,2-dihydroquinoline,
N-carbethoxy-2-methylamino-1,2-dihydroquinoline,
N-carbethoxy-2-diethylamino-1,2-dihydroquinoline,
N-carbethoxy-2-dimethylamino-1,2-dihydroquinoline,
N-carbethoxy-2-phenylamino-1,2-dihydroquinoline,
N-carbethoxy-2-benzylamino-1,2-dihydroquinoline,
N-carbethoxy-2-phenoxy-1,2-dihydroquinoline, N-carbethoxy-2-benzyloxy-1,2-dihydroquinoline,
N-carbethoxy-2-methylthio-1,2-dihydroquinoline,
N-carbethoxy-2-propargyloxy-1,2-dihydroquinoline,
N-carbethoxy-2-diethylaminomethoxy-1,2-dihydroquinoline, respectively.

Example 24

Use in the procedure of Example 3 in place of the mixture of 2-hydroxy-N-carbethoxy-1,2-dihydroquinoline and di-(N-carbethoxy-1,2-dihydro-2-quinolyl)ether of each of the products of Example 20 produces, isobutyl 2-ethoxy-1,2-dihydroquinoline-N-thioncarboxylate,
isopropyl 2-ethoxy-1,2-dihydroquinoline-N-thioncarboxylate,
t-butyl 2-ethoxy-1,2-dihydroquinoline-N-thioncarboxylate,
propargyl 2-ethoxy-1,2-dihydroquinoline-N-thioncarboxylate,
allyl 2-ethoxy-1,2-dihydroquinoline-N-thioncarboxylate,
methallyl 2-ethoxy-1,2-dihydroquinoline-N-thioncarboxylate,
cyclopropyl 2-ethoxy-1,2-dihydroquinoline-N-thioncarboxylate,
cyclohexyl 2-ethoxy-1,2-dihydroquinoline-N-thioncarboxylate,
cycloheptenyl 2-ethoxy-1,2-dihydroquinoline-N-thioncarboxylate,
benzyl 2-ethoxy-1,2-dihydroquinoline-N-thioncarboxylate,
α-phenethyl 2-ethoxy-1,2-dihydroquinoline-N-thioncarboxylate,
β-phenethyl 2-ethoxy-1,2-dihydroquinoline-N-thioncarboxylate,
β-bromoethyl 2-ethoxy-1,2-dihydroquinoline-N-thioncarboxylate,
β-iodoethyl 2-ethoxy-1,2-dihydroquinoline-N-thioncarboxylate,
β-fluoroethyl 2-ethoxy-1,2-dihydroquinoline-N-thioncarboxylate,
γ-chloropropyl 2-ethoxy-1,2-dihydroquinoline-N-thioncarboxylate,
δ-chlorobutyl 2-ethoxy-1,2-dihydroquinoline-N-thioncarboxylate,
p-methylbenzyl 2-ethoxy-1,2-dihydroquinoline-N-thioncarboxylate,
o-methoxybenzyl 2-ethoxy-1,2-dihydroquinoline-N-thioncarboxylate,
p-methoxybenzyl 2-ethoxy-1,2-dihydroquinoline-N-thioncarboxylate,
o-chlorobenzyl 2-ethoxy-1,2-dihydroquinoline-N-thioncarboxylate,
m-bromobenzyl 2-ethoxy-1,2-dihydroquinoline-N-thioncarboxylate,
p-iodobenzyl 2-ethoxy-1,2-dihydroquinoline-N-thioncarboxylate,
o-fluorobenzyl 2-ethoxy-1,2-dihydroquinoline-N-thioncarboxylate,
p-trifluoromethylbenzyl 2-ethoxy-1,2-dihydroquinoline-N-thioncarboxylate,
p-chlorophenylisopropyl 2-ethoxy-1,2-dihydroquinoline-N-thioncarboxylate,
m-methoxybenzyl 2-ethoxy-1,2-dihydroquinoline-N-thioncarboxylate,
o,p-dichlorobenzyl 2-ethoxy-1,2-dihydroquinoline-N-thioncarboxylate,
o,o'-dimethoxybenzyl 2-ethoxy-1,2-dihydroquinoline-N-thioncarboxylate,
o,p-dimethylbenzyl 2-ethoxy-1,2-dihydroquinoline-N-thioncarboxylate, respectively.

Example 25

Use in the procedure of Example 3 in place of the mixture of 2-hydroxy-N-carbethoxy-1,2-dihydroquinoline and di-(N-carbethoxy-1,2-dihydro-2-equinolyl)ether of each of the products of Example 21 produces, ethyl 2-ethoxy-5-chloro-1,2-dihydroquinoline-N-carboxylate,
ethyl 2-ethoxy-6-bromo-1,2-dihydroquinoline-N-carboxylate,
ethyl 2-ethoxy-7-iodo-1,2-dihydroquinoline-N-carboxylate,
ethyl 2-ethoxy-7-fluoro-1,2-dihydroquinoline-N-carboxylate,
ethyl 2-ethoxy-5,7-dichloro-1,2-dihydroquinoline-N-carboxylate,
ethyl 2-ethoxy-5,7-dimethyl-1,2-dihydroquinoline-N-carboxylate,
ethyl 2-ethoxy-5-methyl-1,2-dihydroquinoline-N-carboxylate,
ethyl 2-ethoxy-7-methyl-1,2-dihydroquinoline-N-carboxylate,
ethyl 2-ethoxy-6-chloro-1,2-dihydroquinoline-N-carboxylate,
ethyl 2-ethoxy-7-bromo-1,2-dihydroquinoline-N-carboxylate,
ethyl 2-ethoxy-6-iodo-1,2-dihydroquinoline-N-carboxylate,
ethyl 2-ethoxy-6-methyl-1,2-dihydroquinoline-N-carboxylate,
ethyl 2-ethoxy-6-ethyl-1,2-dihydroquinoline-N-carboxylate,
ethyl 2-ethoxy-5-chloro-6-methyl-1,2-dihydroquinoline-N-carboxylate,
ethyl 2-ethoxy-6-chloro-5-methyl-1,2-dihydroquinoline-N-carboxylate,
ethyl 2-ethoxy-7-chloro-6-methyl-1,2-dihydroquinoline-N-carboxylate,
ethyl 2-ethoxy-6-cyano-1,2-dihydroquinoline-N-carboxylate,
ethyl 2-ethoxy-5-bromo-1,2-dihydroquinoline-N-carboxylate,
ethyl 2-ethoxy-5-trifluoromethyl-1,2-dihydroquinoline-N-carboxylate,
ethyl 2-ethoxy-6-trifluoromethyl-1,2-dihydroquinoline-N-carboxylate,
ethyl 2-ethoxy-6-methyl-7-trifluoromethyl-1,2-dihydroquinoline-N-carboxylate,
ethyl 2-ethoxy-5-methoxy-1,2-dihydroquinoline-N-carboxylate,
ethyl 2-ethoxy-5-acetoxy-1,2-dihydroquinoline-N-carboxylate,
ethyl 2-ethoxy-7-dimethylamino-1,2-dihydroquinoline-N-carboxylate and
ethyl 2-ethoxy-7-diethylamino-1,2-dihydroquinoline-N-carboxylate, respectively.

While the foregoing invention has been described and exemplified in terms of its preferred embodiment, those skilled in the art will appreciate that modifications can be made without departing from the spirit and scope of the present invention.

What is claimed is:

1. The compounds of the formula

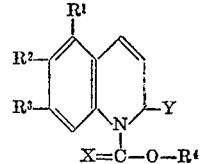

wherein two of the groups $R^1$, $R^2$ and $R^3$ are hydrogen and the other is hydrogen, chloro, bromo, iodo, fluoro, trifluoromethyl, methyl, ethyl, methoxy, ethoxy, methylthio, ethylthio, methylsulfonyl, hydroxy, acetoxy, amino, or a group of the formula

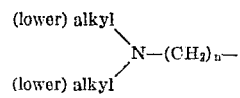

wherein $n$ is an integer from 0 to 3 inclusive and each (lower)alkyl group is methyl or ethyl, X is oxygen or sulfur, $R^4$ is (lower)alkyl, (lower)alkenyl, (lower)alkynyl, cycloalkyl having from 3 to 8 carbon atoms inclusive, halo(lower)alkyl other than α-haloalkyl or a radical of the formula

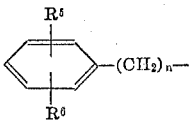

wherein $n$ is an integer from 1 to 3 inclusive and $R^5$ and $R^6$ each are hydrogen, (lower)alkyl, (lower)alkoxy, chloro, bromo, iodo, fluoro, or trifluoromethyl, Y represents hydroxy, (lower)alkoxy, (lower)alkylthio, phenoxy, benzyloxy, ureido, (lower)alkenyloxy, (lower)alkynyloxy, amino, (lower)alkoxycarbonylamino, (lower)alkylamino, di(lower)alkylamino, phenylamino, di(lower)alkylamino(lower)alkoxy or a group of the formula

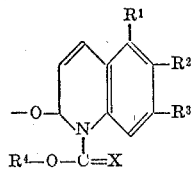

wherein $R^1$, $R^2$, $R^3$, $R^4$ and X have the meanings set forth above, and their nontoxic pharmaceutically acceptable acid addition salts.

2. The compounds of claim 1 having the formula

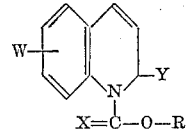

wherein

W is methyl, halogen, amino, dimethylamino or diethylamino and is attached at the 5-, 6- or 7-position, R is (lower)alkyl, X is oxygen or sulfur, Y is hydroxy or (lower)alkoxy, and their nontoxic pharmaceutically acceptable acid addition salts.

3. The compounds of claim 1 having the formula

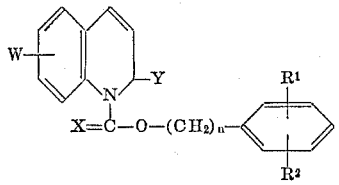

wherein

W is methyl, halogen, amino, dimethylamino or diethylamino and is attached at the 5-, 6- or 7-position, X is oxygen or sulfur, $n$ is one, two or three, $R^1$ and $R^2$ each are hydrogen, (lower)alkyl, (lower)alkoxy, chloro, bromo, iodo, fluoro, or trifluoromethyl, Y is hydroxy or (lower)alkoxy, and their nontoxic pharmaceutically acceptable acid addition salts.

4. The compounds of claim 1 having the formula

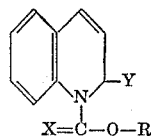

wherein

R is (lower)alkyl,

X is oxygen or sulfur, and

Y is (lower)alkoxy.

5. The compounds of claim 1 having the formula

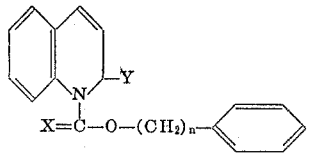

wherein

X is oxygen or sulfur, $n$ is one, two or three, and

Y is (lower)alkoxy.

6. The compound of claim 1 having the formula

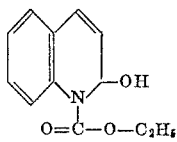

7. The compound of claim 1 having the formula

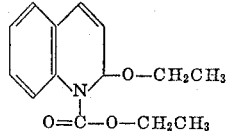

8. The compound of claim 1 having the formula

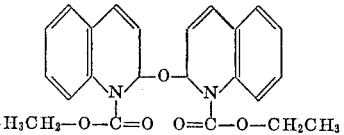

9. The compound of claim 1 having the formula

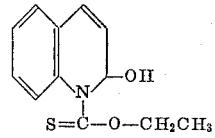

10. The compound of claim 1 having the formula

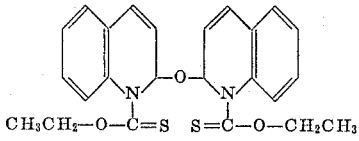

11. The compound of claim 1 having the formula

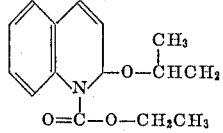

12. The compound of claim 1 having the formula

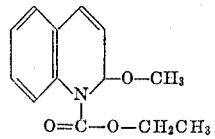

13. The compound of claim 1 having the formula
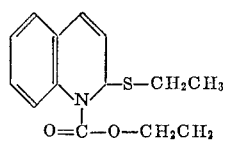
References Cited
UNITED STATES PATENTS
2,623,046  12/1952  Cusic _____ 260—247.2
2,650,919   9/1953  Cusic _____ 260—243
NICHOLAS S. RIZZO, *Primary Examiner.*
D. DAUS, *Assistant Examiner.*

UNITED STATES PATENT OFFICE
CERTIFICATE OF CORRECTION

Patent No. 3,389,142                                     June 18, 1968

Norman L. Weinberg

It is certified that error appears in the above identified patent and that said Letters Patent are hereby corrected as shown below:

Column 1, lines 55 to 58, the formula should appear as shown below:

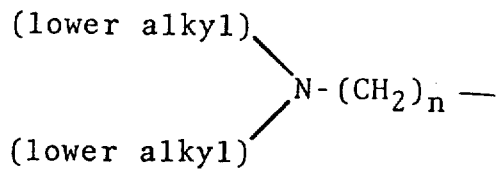

Column 2, line 49, "alkylamono," should read -- alkylamino --. Column 3, line 7, "er(alkynyloxy," should read -- er)alkynyloxy, --; line 28, cancel " Y represents hydroxy or (lower) alkoxy,". Column 4, line 65, "12 of Formula 13" should read -- 12 or Formula 13 --; line 66, "a alcohol" should read -- an alcohol --. Column 5, line 57, "E. H. Rood" should read -- E. H. Rodd --. Column 6, line 74, "50 mm./kg." should read -- 50 mgm./kg. --. Column 11, line 72, "15° C." should read -- 165° C. --. Column 13, line 17, "methoxybenzylcarbonyl-" should read -- Methoxybenzyloxycarbonyl- --. Column 15, line 9, "dihydroquinolne" should read -- dihydroquinoline --; line 29, "2-hydroxyl" should read -- 2-hydroxy --. Column 16, line 54, "dihydra" should read -- dihydro --. Column 19, line 74, "2-equinolyl)" should read -- 2-quinolyl) --. Column 21, line 23, "mino, di(lower)alkylamino" should read -- mino, benzylamino, di(lower)alkylamino --.

Signed and sealed this 13th day of January 1970.

(SEAL)
Attest:

EDWARD M. FLETCHER, JR.
Attesting Officer

WILLIAM E. SCHUYLER, JR.
Commissioner of Patents